(12) United States Patent
Incerti et al.

(10) Patent No.: US 7,967,478 B2
(45) Date of Patent: Jun. 28, 2011

(54) DEVICE FOR REDIRECTING THE LUMINOUS FLUX EMITTED BY ONE OR MORE LED

(75) Inventors: Edda Incerti, Emilia (IT); Mauro Cucchi, Noceto (IT)

(73) Assignee: Incerti & Simonini di Incerti Edda & C. S.N.C., Canossa (IT)

( * ) Notice: Subject to any disclaimer, the term of this patent is extended or adjusted under 35 U.S.C. 154(b) by 260 days.

(21) Appl. No.: 12/226,782

(22) PCT Filed: Apr. 30, 2007

(86) PCT No.: PCT/IT2007/000316
§ 371 (c)(1),
(2), (4) Date: Jan. 16, 2009

(87) PCT Pub. No.: WO2007/125564
PCT Pub. Date: Nov. 8, 2007

(65) Prior Publication Data
US 2009/0310368 A1    Dec. 17, 2009

(30) Foreign Application Priority Data
Apr. 28, 2006    (IT) .............................. RE2006A0052

(51) Int. Cl.
*F21V 5/00*    (2006.01)
(52) U.S. Cl. ........ 362/326; 362/327; 362/332; 362/650; 362/308

(58) Field of Classification Search .......... 362/326–328, 362/253, 650, 332, 308, 309, 800; 315/185 S
See application file for complete search history.

(56) References Cited

U.S. PATENT DOCUMENTS

| 2,224,178 | A | 12/1940 | Bitner |
| 6,218,785 | B1 * | 4/2001 | Incerti ........................ 315/185 S |
| 7,413,325 | B2 * | 8/2008 | Chen ........................ 362/249.01 |
| 2002/0163810 | A1 | 11/2002 | West et al. |
| 2004/0027833 | A1 | 2/2004 | Amano et al. |
| 2006/0152820 | A1 | 7/2006 | Lien et al. |
| 2009/0067180 | A1 * | 3/2009 | Tahmosybayat .............. 362/339 |

FOREIGN PATENT DOCUMENTS

| EP | 1 255 306 | 11/2002 |
| GB | 2 372 091 | 8/2002 |
| JP | 2002-352602 | 12/2002 |
| WO | 2007/069181 | 6/2007 |

OTHER PUBLICATIONS

International Search Report mailed Aug. 30, 2007 for International Application No. PCT/IT2007/000316.

* cited by examiner

*Primary Examiner* — Evan Dzierzynski
(74) *Attorney, Agent, or Firm* — Wenderoth, Lind & Ponack, L.L.P.

(57) ABSTRACT

A device redistributes light emitted by one or more LEDs and constitutes a secondary optical component for the construction of sources, lamps, illuminating bodies, and solid state optical signaling apparatuses. In one of its basic forms the device comprises a main optical element and an optical protection case coupled by a pin, with the optical element being disposed in a cavity of the protection case.

37 Claims, 2 Drawing Sheets

US 7,967,478 B2

DEVICE FOR REDIRECTING THE LUMINOUS FLUX EMITTED BY ONE OR MORE LED

FIELD OF THE INVENTION

The present invention relates to a device for redirecting the luminous flow emitted by one or more LEDs as a secondary optical component for the construction of sources, lamps, illuminating bodies and solid state optical signaling apparatuses.

The object of the present invention is to obtain with the lowest possible fabrication costs with respect to what is known in the prior art and available commercially a device for redistributing the luminous flow emitted by one or more LEDs in such a way that the optical axis is rotated by 90° and at the same time the emission angles can be varied relative to said axis.

DESCRIPTION OF RELATED ART

In the most general form, all current devices for redistributing the luminous flow with rotation of the optical axis to 90° for LED emitters provide for the use of conical solid structures with the vertex reversed and oriented towards the upper part of the primary lenses integral with the LED emitters.

An additional characterization of the devices currently in use is that their conical shape is typically supported by a hollow cylindrical structure within which are located the LEDs and which is fastened to the outer edge of said emitter or to the surface/structure whereon they are positioned.

Further variants of the devices currently in use provide for the use or the modification of primary lenses so that at the top of the standard convex shape of the surface of said lenses is obtained a depression with a conical shape with the vertex towards the junction to the semiconductor emitter of the luminous flow.

SUMMARY OF THE INVENTION

The main object of the present invention is to provide superior functional performance with respect to the prior art in relation to the capability of defining differently the angles of emission above and below the optical axis rotated by 90° with respect to that of the LED emitters and at the same time obtaining a greater intensity of emission due to the mutually combined functionalities of optical reflection and refraction.

Because it has no direct connection to the LEDs, a further advantage of the invention is that it can be inserted within optical protection cases typically in use in lamps and thereby allow their easy replacement, if required for maintenance reasons or because of changed requirements of the redistribution of the luminous flow, by virtue of the connection by conical insertion or in snap-in fashion.

These objects and advantages are all achieved by the invention in question as it is characterized by the appended claims.

Additional characteristics and advantages of the present invention will become more readily apparent from the following detailed description of preferred, but not exclusive, embodiments of the invention, all based on the same principle and illustrated purely by way of non limiting example in the accompanying figures, in which:

DETAILED DESCRIPTION OF THE DRAWINGS

DETAILED DESCRIPTION OF THE INVENTION

With reference to the aforementioned figures, the numeral 1 indicates the main optical element of invention, 20 the optical protection case, 40 an optional reflector/diffuser, 50 an optional spacer element, 60 an alternative separate connection element, 30 a typical commercial solid state source.

Figure 1:
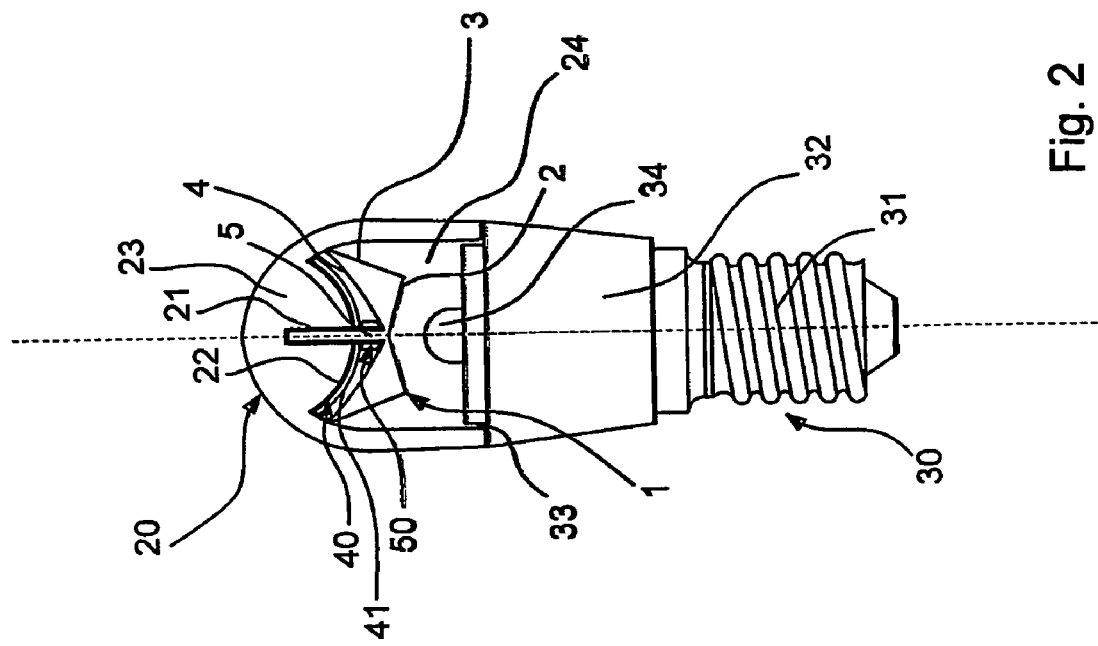
FIG. 1 shows the section view of the invention comprising the set of its elements among which the optical protection case (where for the sake of illustration clarity the usual dashed lines are omitted) coupled onto a characteristic solid state source shown in a lateral view.
Figure 4:
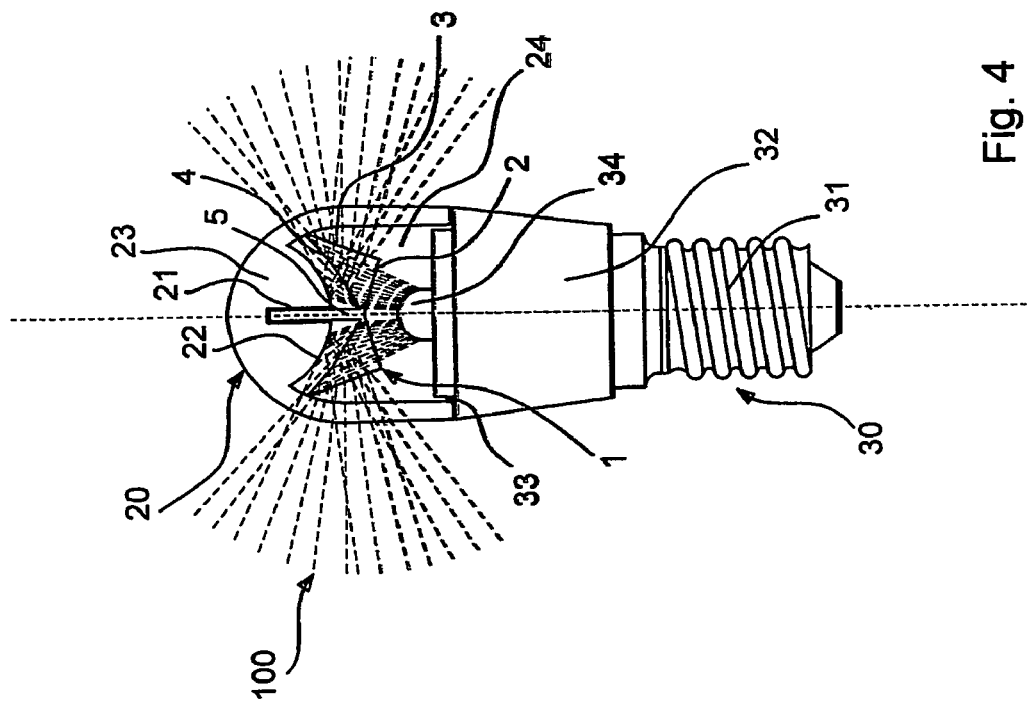
FIG. 4 shows the invention of FIG. 1 in which with dashed lines are shown the modifications made to the distribution of the main luminous flow produced by the LED emitters.

With reference to FIG. 1, the conformation of the main optical element 1, preferably but not exclusively made of optical grade polycarbonate, for the purposes of redistributing the luminous flow according to what is described above and shown in FIG. 4 with the reference number 100 is achieved by:
a profile indicated by the number 2 that inferiorly by revolution around the axis of symmetry defines a surface characterizing a conical cavity with the vertex positioned in opposite direction relative to the primary lenses of the LEDs indicated by the number 34 (unlike what is found in products currently available on the market and according to the prior art),
a profile indicated by the number 4 that superiorly by revolution around the axis of symmetry defines a surface characterizing a cupola-shaped cavity with the vertex positioned in the direction of the primary lenses of the LEDs indicated with the number 34;
a profile indicated by the number 3 that laterally by revolution around the axis of symmetry defines a surface characterizing a cone frustum shaped solid with the vertex positioned in the direction of the primary lenses of the LEDs indicated by the number 34.

With reference to FIG. 1, the number 5 indicates a cylindrical pin preferably with slight conicity obtained as an appendage of the element 1.

With reference to FIG. 1, the number 21 indicates a cylindrical cavity, preferably with slight conicity located inside the thickened region 23 of the optical protection case 20 to house the pin 5 and achieve the mechanical coupling between the elements 20 and 1.

In relation to the optical protection case 20 of FIG. 1, preferably but not exclusively made of optical grade polycarbonate, the thickened region at the top 23 has an inner surface 22 that is convex towards the inner cavity 24. Said convex surface 22 is preferably made in such a way as to obtained a diffuse reflection.

With reference to FIG. 1, the number 33 indicates the edge for fastening, in snap-in fashion or by screw or with other means, the commercial solid state source 30 with the elements 20 and 1 previously coupled to each other by insertion in the hollow region 24.

Also with reference to FIG. 1, the commercial solid state source 30 may also be of the type lacking the adapter ring 32 and constituted by the sole electrical attachment 31 comprehensive of the electrical/electronic circuits for controlling the current to the LED emitters 34. This possibility, not shown in the figures, entails that the edge of the electrical attachment serves the same function as the edge 33 of the adapter ring 32 for the purposes of fastening, in snap-in or screw-in fashion, or by other means, to the optical elements 20 and 1.

Figure 2:
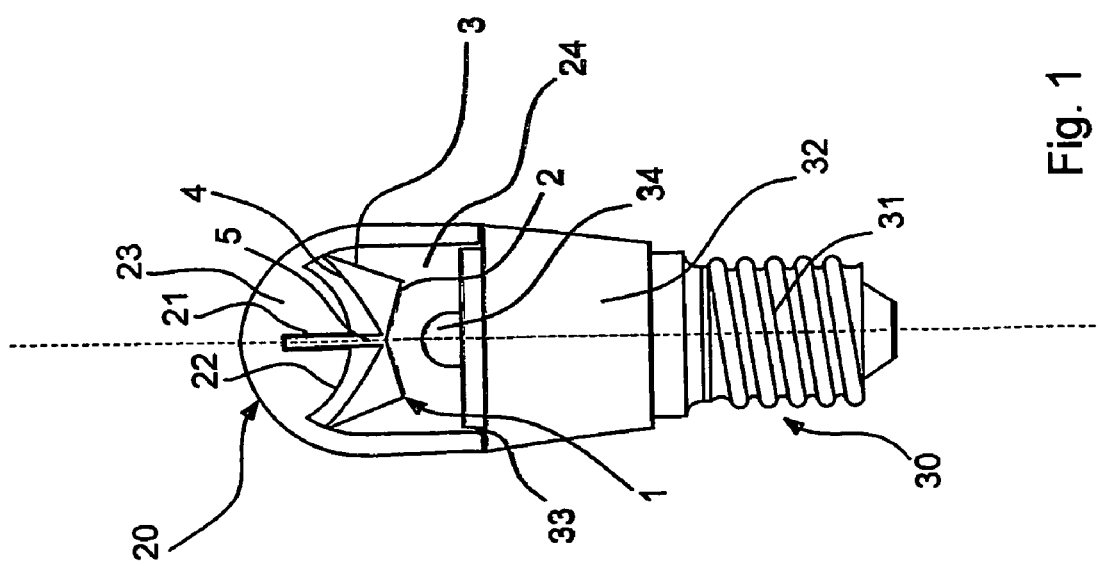
FIG. 2 shows a variant of the invention shown in the same way as FIG. 1 and characterized by an additional reflecting/diffusing element and by an additional spacer element.

With reference to FIG. 2, as an embodiment variant of the invention indicated in FIG. 1, the reference 40 indicates a reflector/diffuser element having a convex surface 41 of the specular reflecting or diffuse reflecting type.

The element 40, made of metallic or plastic material with an added metal-coating, will be positioned by the element 1 at a distance predetermined by means of a spacer element 50.

In an additional embodiment, not shown, the spacer element 50 may be obtained as an appendage of the reflector/diffuser element 40 or alternatively to the main optical element 1.

With reference to FIG. 2, the remaining elements shown serve the same purpose indicated for the those of FIG. 1, whereto the reader is referred for their description.

Figure 3:
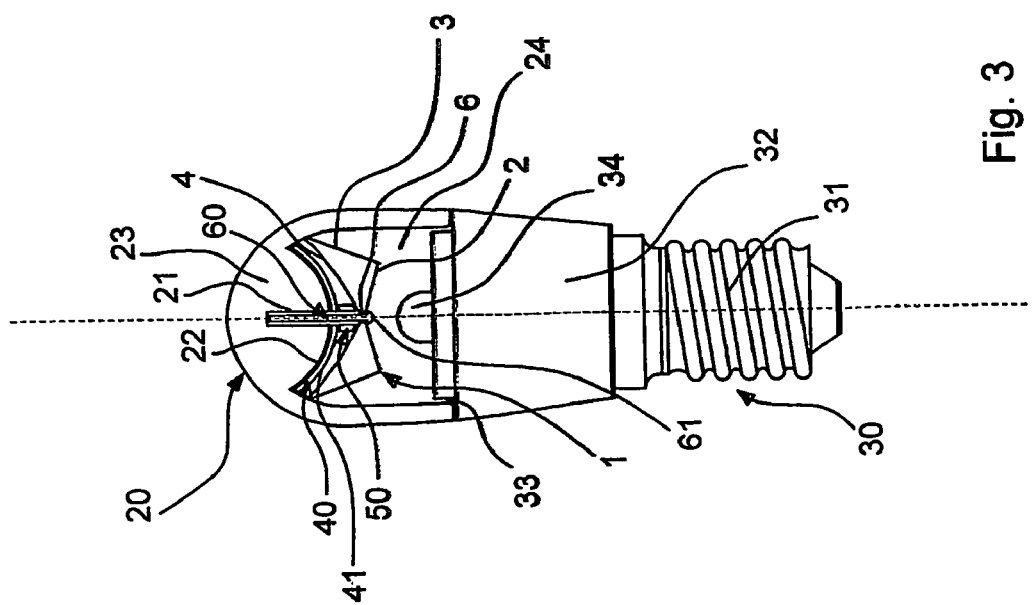
FIG. 3 shows an additional variant of the invention shown in the same way as FIG. 2 and characterized by an additional element for connecting to the optical protection case.

With reference to FIG. 3, as an additional embodiment of the invention of FIG. 2, the number 6 indicates a hole at the centre of the main optical element 1 instead of the cylindrical pin 5 into which is inserted, during the coupling with the optical protection case 20, a preferably metallic pin 60, with its surface preferably nickel- or chrome-plated, provided with retaining head 61 to reduce the slight luminous flow dispersed in the direction of the optical axis of the LEDs 34.

With reference to FIG. 3, the remaining elements shown serve the same function indicated for those of FIG. 2, whereto the reader is referred for their description.

It is specified that in accordance with the teachings provided by the present description, the surfaces of the optical elements can be subject to numerous dimensional variations in the geometry of the profiles indicated with the numbers 4, 3, 2, 22, 41 for the purposes of modifying the upper and lower angles of redistribution of the luminous flow with axis of 90° relative to that of the LEDs 34, in order to meet the different application requirements.

Moreover, it is stressed that the invention and its described variants may be subject to numerous changes of a practical-application nature of the constructive details (among them, materials used and systems for interconnecting the elements) without thereby departing from the scope of the inventive idea as claimed below.

The invention claimed is:

1. A device for redistributing light emitted by an LED, the device comprising an optical element for reflecting and refracting the light emitted by the LED,
    wherein a lower profile of the optical element defines a first surface by revolution around an axis of symmetry, the first surface having a conical cavity with a vertex pointing away from a primary lens of the LED,
    wherein an upper profile of the optical element defines a second surface by revolution around the axis of symmetry, the second surface having a cavity with a vertex pointing toward the primary lens of the LED,
    wherein a side profile of the optical element defines a third surface by revolution around the axis of symmetry, the third surface being a cone frustum-shaped solid narrowing toward the primary lens of the LED,
    wherein the device rotates an optical axis of the light emitted from the LED by 90°, and
    wherein the optical element varies emission angles of the light emitted from the LED relative to the axis of symmetry.

2. The device of claim 1, further comprising a pin for coupling the optical element to other components.

3. The device of claim 2, further comprising an optical protection case having an inner cavity,
    wherein the optical element is coupled to the optical protection case by disposing the pin in the inner cavity.

4. The device of claim 3, wherein the optical protection case has an upper thickened region with a convex surface which diffuses and reflects the light emitted from the LED.

5. The device of claim 4, wherein the optical protection case has a cavity for connection to a commercial solid state source.

6. The device of claim 5, wherein interposed between the surface of the upper thickened region and the optical element is an additional element made of plastic material with a metal-coating having a specular reflecting surface.

7. The device of claim 6, wherein the specular reflecting surface is curved and diffuses light.

8. The device of claim 7, wherein the optical element and the additional element are distanced by a spacer element.

9. The device of claim 3, wherein the optical protection case is made of PMMA.

10. The device of claim 3, wherein the optical protection case is made is glass.

11. The device of claim 3, wherein the optical protection case is made of crystal.

12. The device of claim 6, wherein the optical element and the additional element are distanced by a spacer element.

13. The device of claim 12, wherein the spacer element is an appendage of the additional element.

14. The device of claim 12, wherein the spacer element is an appendage of the optical element.

15. The device of claim 6, wherein the additional element is made of metal.

16. The device of claim 1, wherein the optical element has a hole in a central part thereof for insertion of a separate pin provided with a retaining head to reduce the light dispersed along the direction of the optical axis of the LED.

17. The device of claim 16, wherein the separate pin is made of metallic material.

18. The device of claim 17, wherein the separate pin is coated with polished nickel.

19. The device of claim 17, wherein the separate pin is coated with polished chrome.

20. The device of claim 1, further comprising an optical protection case having an inner cavity,
    wherein the optical protection case has an upper thickened region with a convex surface which diffuses and reflects the light emitted from the LED,
    wherein the device includes a separate pin which is separate from the optical element and which includes a retaining head for retaining the optical element,
    wherein the optical element has a hole in a central part thereof for insertion of the separate pin,
    wherein the optical element is coupled to the optical protection case by disposing the separate pin in the hole of the optical element and in the inner cavity.

21. The device of claim 20, wherein interposed between the surface of the upper thickened region and the optical element is an additional element made of plastic material with a metal-coating having a specular reflecting surface,
    wherein the specular reflecting surface is curved and diffuses light,
    wherein the optical element and the additional element are distanced by a spacer element.

22. The device of claim 21, wherein the spacer element is provided on the separate pin.

23. The device of claim 22, wherein the separate pin is made of metallic material.

24. The device of claim 23, wherein the separate pin is coated with polished nickel.

25. The device of claim 23, wherein the separate pin is coated with polished chrome.

26. The device of claim 21, wherein the separate pin is made of metallic material.

27. The device of claim 26, wherein the separate pin is coated with polished nickel.

28. The device of claim 26, wherein the separate pin is coated with polished chrome.

29. The device of claim 20, wherein the separate pin is made of metallic material.

30. The device of claim 29, wherein the separate pin is coated with polished nickel.

31. The device of claim 29, wherein the separate pin is coated with polished chrome.

32. The device of claim 1, wherein the optical element is made of PMMA.

33. The device of claim 1, wherein the optical element is made of glass.

34. The device of claim 1, wherein the optical element is made of crystal.

35. The device of claim 1, wherein the optical element is made of polycarbonate.

36. The device of claim 1, wherein the cavity of the second surface is a cupola-shaped cavity.

37. An LED apparatus comprising:
the device of claim 1;
an LED; and
an electrical attachment for controlling current to the LED,
wherein the optical element is arranged such that light emitted from the LED passes through the optical element from the lower profile to the upper profile.

* * * * *